(12) United States Patent  
Yee (10) Patent No.: US 7,760,193 B2
(45) Date of Patent: Jul. 20, 2010

(54) DURABLE TOP SURFACE FOR INTERACTIVE DISPLAY

(75) Inventor: Dawson Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 11/204,676

(22) Filed: Aug. 15, 2005

(65) Prior Publication Data

US 2007/0035540 A1 Feb. 15, 2007

(51) Int. Cl.
H05K 7/00 (2006.01)

(52) U.S. Cl. ..................... 345/175; 361/679.4

(58) Field of Classification Search ................ 345/156, 345/173, 175; 361/684, 72, 679.01, 679.02, 361/679.4, 679.21, 679.22; 353/71, 72, 74–78, 353/119; 349/58, 60
See application file for complete search history.

(56) References Cited

U.S. PATENT DOCUMENTS

| 4,791,746 | A | | 12/1988 | Coronato | 40/547 |
| 5,572,205 | A | | 11/1996 | Caldwell et al. | 341/33 |
| 5,729,250 | A | | 3/1998 | Bishop | 345/175 |
| 5,736,686 | A | * | 4/1998 | Perret et al. | 345/175 |
| 6,031,524 | A | | 2/2000 | Kunert | 345/173 |
| 6,083,339 | A | * | 7/2000 | Peters et al. | 156/245 |
| 6,219,038 | B1 | | 4/2001 | Cho | 345/173 |
| 6,864,882 | B2 | * | 3/2005 | Newton | 345/175 |
| 6,900,795 | B1 | * | 5/2005 | Knight et al. | 345/175 |
| 2002/0031622 | A1 | | 3/2002 | Ippel et al. | 428/1.6 |
| 2003/0151589 | A1 | * | 8/2003 | Bensen et al. | 345/156 |
| 2004/0196412 | A1 | * | 10/2004 | Cariolato | 349/58 |
| 2005/0049049 | A1 | * | 3/2005 | Griswold et al. | 463/46 |
| 2006/0114245 | A1 | * | 6/2006 | Masters et al. | 345/175 |
| 2006/0214907 | A1 | * | 9/2006 | Devos et al. | 345/108 |
| 2006/0267952 | A1 | * | 11/2006 | Alcorn | 345/173 |

OTHER PUBLICATIONS

"Australian Design Awards; Multimedia Payphone (MmP)." 4pp. http://www.designawards.com.au/ADA/99-00/INDUSTRIAL%20DESIGN/018/018.HTM. Printed Feb. 6, 2006.
Caltron Industries, Inc. "Touch Screen Technologies." 2pp.http://www.caltronind.com/touch_screen_signage_options/touchscreen_technologies.html. Printed Feb. 6, 2006.
EAO International. "Touch Sensitive Technology." 3pp. <http//www.eao.com/global/en/knowledge/appliedtechnology/touchsensitive.asp?navid=16>. Printed Feb. 6, 2006.
Elo Touchsystems. "Touchscreen Technology Choices."2pp. http://www.elotouch.com/products/detech2.asp. Printed Feb. 6, 2006.

* cited by examiner

Primary Examiner—Chanh Nguyen
Assistant Examiner—Allison Walthall
(74) Attorney, Agent, or Firm—Workman Nydegger (57) ABSTRACT

An interactive display that is resistant to liquid spills and vandalism. An interactive display includes a display chassis that has a chassis top support. A tamper proof and liquid resistant display surface can be attached to the chassis top support with a plurality of fasteners, so that the top is readily removable and thus, easily replaced if scratched or otherwise damaged. When attached to the display chassis, the display surface forms a continuous, gap-free top surface that prevents liquid from entering the display chassis.

18 Claims, 7 Drawing Sheets

DURABLE TOP SURFACE FOR INTERACTIVE DISPLAY

BACKGROUND

Presently, there are a wide variety of user-interactive display systems on the market. For example, touch screen computers, commercial and consumer video games, kiosks, and automated teller machines, all utilize some form of interactive display. Additionally, other types of interactive display technologies are finding application in appliances such as microwaves, refrigerators, and even washers and dryers. Generally, interactive displays are constructed of materials having particular optical properties that are required for the specific type of display/input technology being used.

Since most commercial interactive display devices are operated vertically, or in a nearly vertical position, in order to maximize optical contrast, such displays are not generally configured for impact resistance or liquid spill resistance. However, in the case of a kiosk designed for installation in a public facility, such as an airport or a national park, it is quite important that the user interface surface comprising the interactive display be resistant to liquids, vandal resistant, and readily replaceable in the event of damage by users. Therefore, an interactive display that provides a durable, removable top surface having desirable optical properties, and which is also tamper resistant and not damaged by liquid spills would be of particular interest.

SUMMARY

Several implementations of an interactive display that is resistant to liquid spills and vandalism are described below in detail. In one implementation, an interactive display includes a display chassis that has a chassis top support. A tamper proof and liquid resistant display surface can be attached to the chassis top support with a plurality of fasteners, so that the top is readily removable and thus, easily replaced if scratched or otherwise damaged. When attached to the display chassis, the display surface forms a continuous, gap-free top surface that prevents liquid from entering the display chassis.

Another implementation described in detail below is directed to a spill and vandal resistant top for an interactive display system. The system is described as having an optically transparent top layer and a mounting frame. The top layer is described as including a shatter-resistant sheet having upper and lower surfaces with an edge surface extending between the upper and lower surfaces. The mounting frame is described in one implementation as having a bonding surface that is bonded to the lower surface of the top layer, adjacent to the edge of the top layer. A chassis attachment surface can be affixed to the support layer against the lower surface of the top layer using fasteners that are configured to mount the mounting frame to a supporting chassis of the interactive display system. A plurality of receptacles are provided in the mounting frame for fasteners so that the top layer can readily be removed and replaced if damaged, by releasing the fasteners. The upper surface of the top layer again presents a continuous, gap-free surface that prevents a spilled liquid from entering the interactive display system and resists removal and damage by vandalism.

A method for attaching a liquid and tamper resistant top to an interactive display chassis is also described in detail below. A plastic mounting frame is bonded to an undersurface of a plastic surface layer to provide a unified interactive display top. The mounting frame can be configured to mount to the interactive display chassis. Fastener receptacles are provided on the plastic mounting frame, and corresponding mounting orifices for fasteners are provided on the interactive display chassis. As described below, the mounting orifices are configured for alignment with the receptacles on the plastic mounting frame. The interactive display top can thus be removably coupled to the interactive display chassis with the fasteners.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. Furthermore, it should be understood in the following description and claims that when lists of alternatives are offered using the conjunctive form "and" that what is meant is "and/or."

Figure 1:
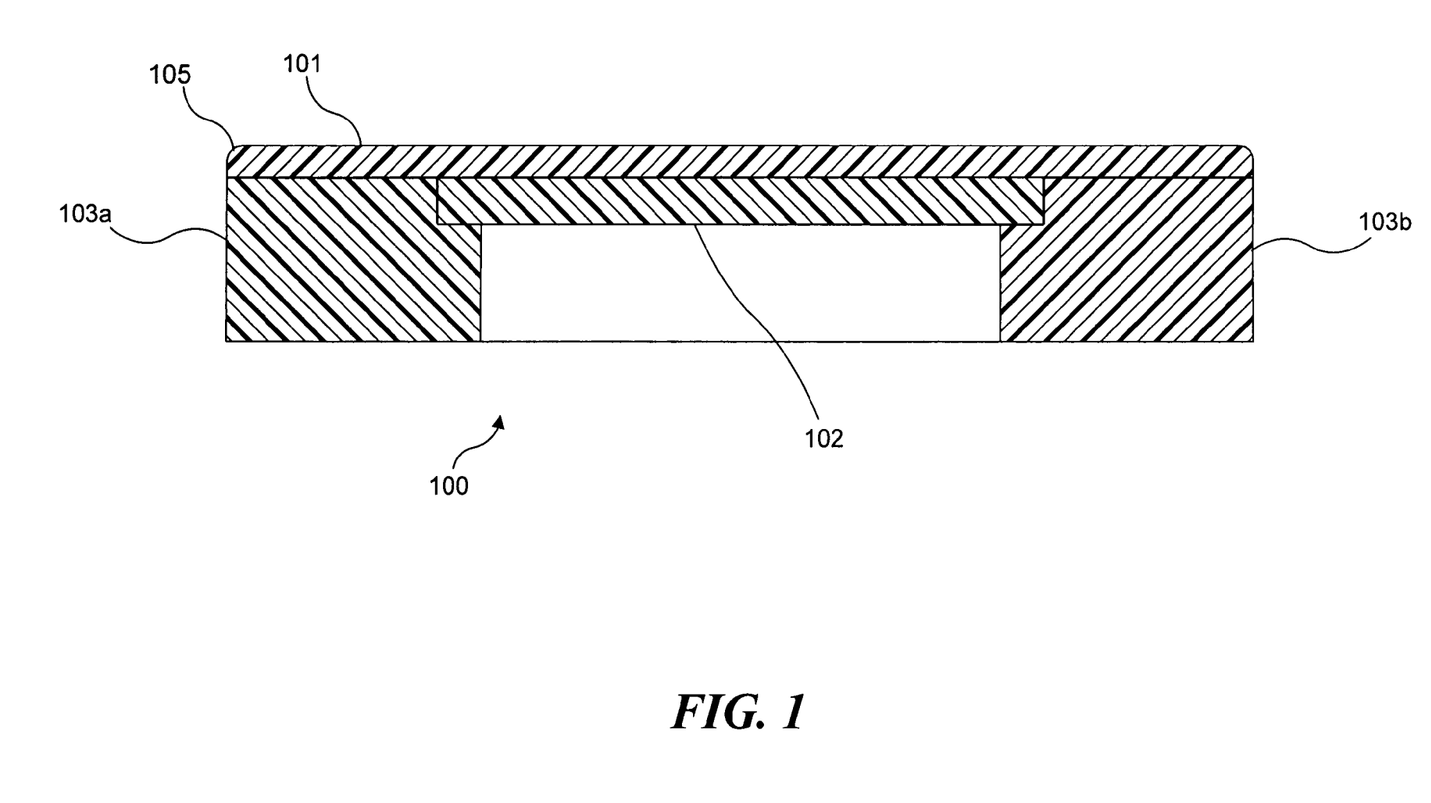
FIG. 1 is a simplified cross-sectional view of a spill resistant top surface for an interactive display.

FIG. 1 is a simplified cross-sectional view of a spill and vandalism resistant top surface 100 for an interactive display. As depicted in FIG. 1, top surface 100 includes a top layer 101 that is affixed to a chassis top support 103a and 103b, which is illustrated in cross-section. A support layer 102 is held in a generally fixed position by the attachment of top layer 101 to mounting frame rails 103a and 103b, which can be attached to an underlying support chassis of an interactive display. Top surface 100 thus provides a smooth, ridgeless, spill resistant and vandal resistant user display surface. In one implementation top layer 101 is made from a plastic, such as an acrylic plastic. Furthermore, top layer 101 can be selected for particular desired tactile properties, such as slipperiness or high coefficient of friction. Top layer 101 can also be selected for durability, shatter resistance, scratch resistance, and chemical resistance properties, and for optical properties such as contrast, diffusion, and tint. In one implementation, as shown in FIG. 1, a radius 105 is provided around the periphery of top layer 101, between the edge of the top layer and its upper surface. The radius eliminates sharp corners on the upper edge of top layer 101.

Figure 2:
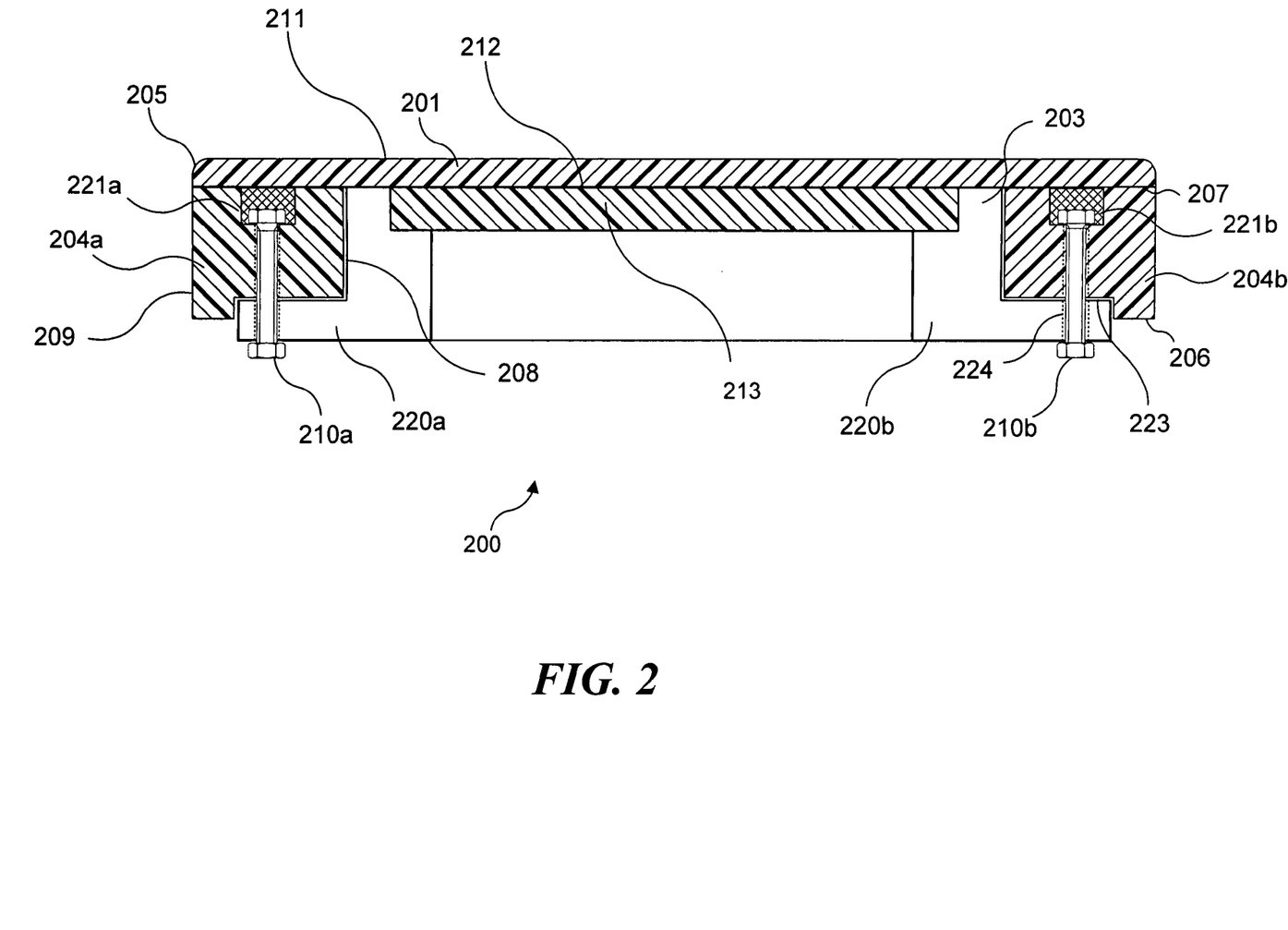
FIG. 2 is a simplified cross-sectional view of a removable spill and tamper-resistant top surface for an interactive display.

FIG. 2 is a simplified cross-sectional view of a removable spill and tamper-resistant top surface 200 for an interactive display. As shown in FIG. 2, top surface 200 includes a top layer 201 having an upper surface 211 and a lower surface 212. Also depicted in cross-section in FIG. 2 is a mounting frame, identified as mounting frame portions 204a and 204b. By way of illustration, a bonding surface 207 of mounting frame portion 204b is shown bonded to lower surface 212 of top layer 201. Mounting frame portion 204a can be similarly bonded to bottom layer 212. Fastener receptacles 221a and 221b are shown within mounting frame portions 204a and 204b, respectively. Fasteners 210a and 210b are shown disposed within fastener receptacles 221a and 221b, respectively.

A chassis top support, shown in cross-section as chassis top support portions 220a and 220b, is configured to receive fasteners 210a and 210b, respectively. By way of illustration, a through-hole (or orifice) 224 is illustrated in chassis top support portion 220b for receiving fastener 210b, thereby enabling a lower surface 206 of mounting rail portion 204b to be affixed to a mounting surface 223 of chassis top support portion 204b with fastener 210b. A support layer 213 can be held in fixed position against mounting frame portions 204a-204b by top layer 201 when fasteners 210a-210b are tightened to affix the top layer to the chassis top support. In one implementation, a peripheral edge radius 205 can be provided between upper surface 211 and an outer edge surface 209 of mounting rail portions 204a and 204b. In another embodiment (not shown), fastener receptacle 221a can extend to an inner surface 208 of mounting rail portion 204a. In still another embodiment, outer edge surface 209 can be smooth polished across the joint between mounting rail portion 204a and top layer 201. When edge surface 209 is smooth polished, the bond between mounting rail portions 204a-204b and top layer 201 is indistinguishable to the human eye due to the type of adhesive used. Top surface 200 appears to essentially be a tamperproof one-piece unit, since there are no evident exposed edges or gaps that can be pried apart.

Top layer 201 can be any suitable material having the desired tactile, durability, optical, and other properties. In one implementation, top layer 201 is a high contrast, diffusing acrylic plastic. Support layer 213 can be any material having the desired optical properties and stiffness. In one implementation, support layer 213 is an optically transparent acrylic plastic. In another implementation, one or more surfaces of mounting rail portions 204a-204b are bonded to the top layer with a plastic welding adhesive, such as a product containing one or more glues or solvents. Examples of suitable adhesives or solvents include cyanoacrylate ester, methyl-ethyl-ketone, dichloromethane, and acetone.

Fasteners 210a and 210b can be any fastener suitable for removable attachment of top layer 201 to chassis top support 220a and 220b. In one implementation fasteners 210a-210b can, for example, be a metal or plastic nut and bolt, a metal or plastic camlock, a screw, a dowel, and the like. Those of ordinary skill in the art will understand that a variety of suitable fasteners can be used for this purpose.

Figure 3:
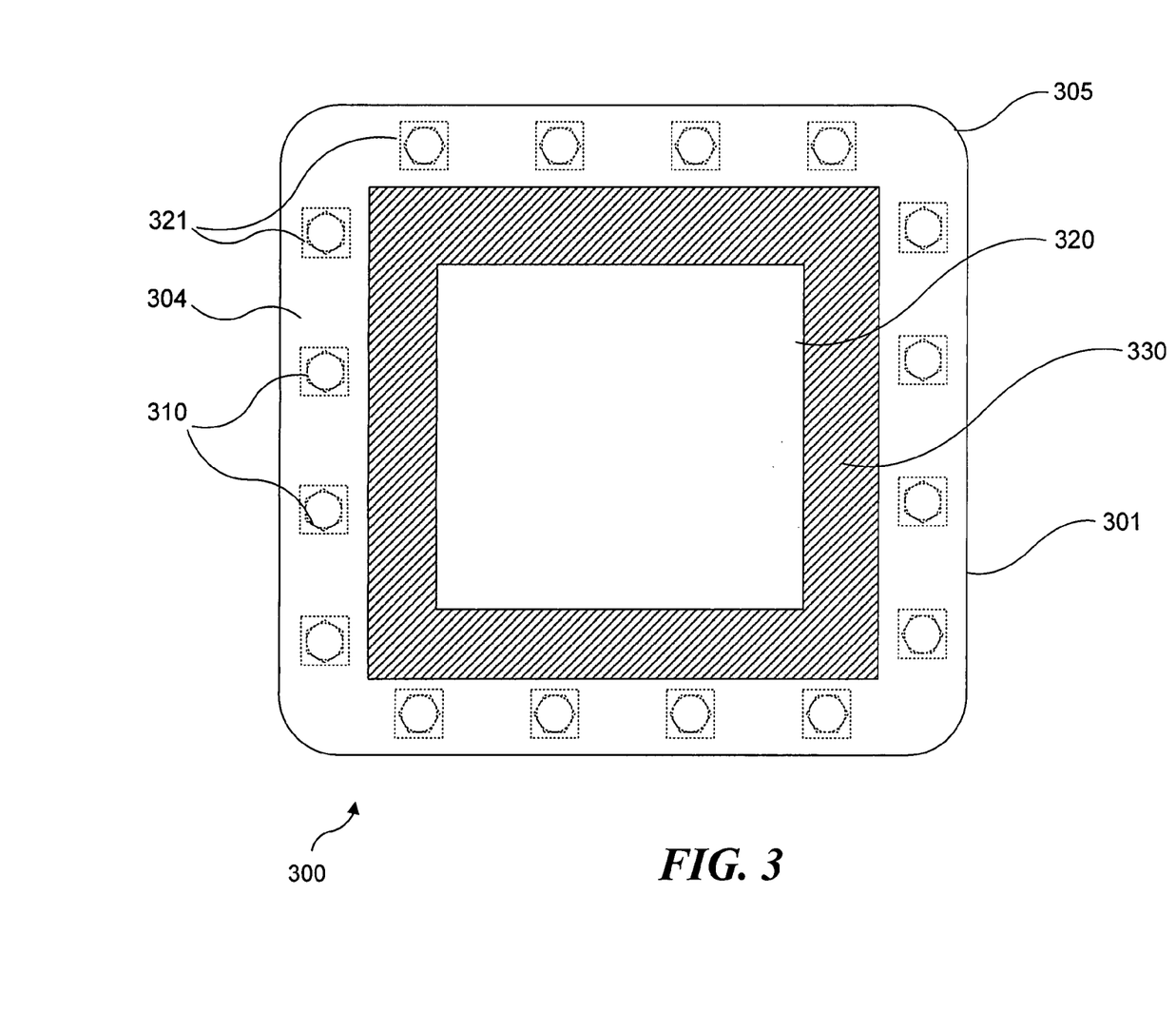
FIG. 3 is a top plan view of a removable spill and tamper-resistant top surface for an interactive display, with hidden lines showing the location of fastener receptacles.

FIG. 3 illustrates an exemplary removable spill and tamper-resistant top surface 300 for an interactive display. A top layer 301 is bonded to a mounting frame 304 that includes a plurality of hidden receptacles 321, having corresponding hidden fasteners 310. In general, hidden receptacles 321 and hidden fasteners 310 are not visible to a user. It should be understood that FIG. 3 is not drawn to scale, and further, that some features of FIG. 3 are exaggerated in order to highlight a physical configuration of one implementation. FIG. 3 further illustrates a viewing area 320, which is surrounded by a shadow mask 330. In one implementation, an edge radius 305 can optionally be provided between adjacent peripheral edges of top surface 300 and top layer 301. In this implementation, of the top corners of top layer 301 are routed away and polished to form a smooth radius along the peripheral edge to increase user comfort.

Figure 4:
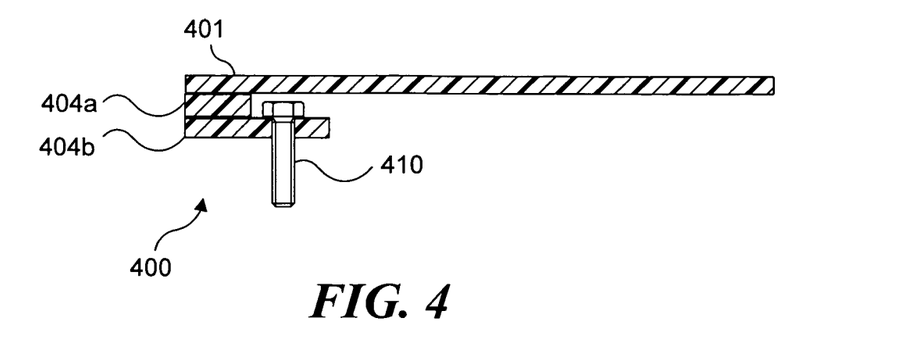
FIG. 4 is another cross-sectional view of a removable spill and tamper-resistant top surface for an interactive display.

FIG. 4 is cross-sectional view of a portion of another removable spill and tamper-resistant top surface 400 for an interactive display. FIG. 4 illustrates one implementation for creating a mounting frame assembly from two or more layers (e.g., layers 404a and 404b). By selecting mounting frame assembly layers that have particular geometries and either slots or orifices provided in at least one of the layers, receptacles for fasteners (e.g., 410) can be created by stacking and bonding the layers together with a suitable solvent or adhesive, examples of which are noted above. In this manner, for example, top layer 401 is bonded to layer 404a of the mounting rail assembly, and layer 404b of the mounting rail assembly is bonded to the layer 404a. One or more additional layers (not shown) can optionally be bonded to layer 404b in a similar fashion, until the desired thickness of top surface 400 is achieved.

Figure 5:
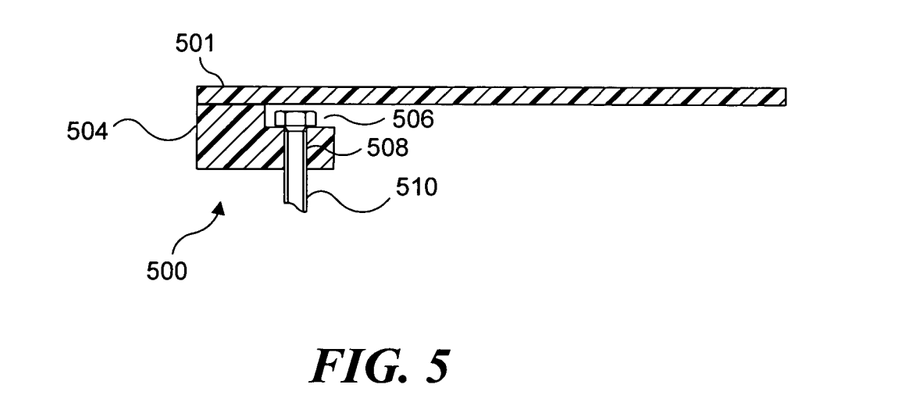
FIG. 5 is yet another cross-sectional view of a removable spill and tamper-resistant top surface for an interactive display.

FIG. 5 is a cross-sectional view of a portion of yet another removable spill and tamper-resistant top surface 500 for an interactive display that includes a top layer 501 bonded to a mounting frame 504 having receptacles 506 that overlie orifices 508 for receiving fasteners 510 (only one receptacle/orifice and one fastener shown). Mounting frame 504 can be machined to remove material to create receptacle 506 for accommodating the head of fastener 510. In this manner, top layer 501 can be removably attached to a chassis top support.

Figure 6:
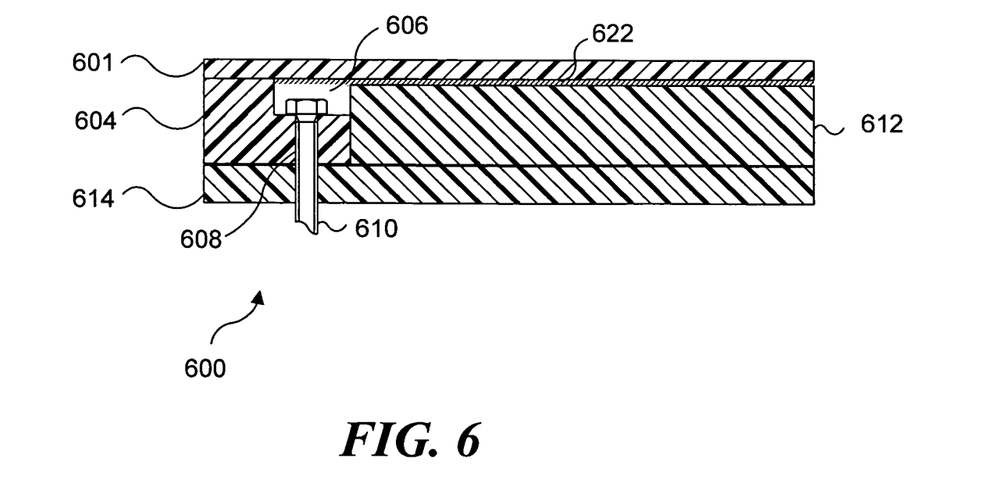
FIG. 6 is still another cross-sectional view of a removable spill and tamper-resistant top surface for an interactive display.

FIG. 6 is a cross-sectional view of a portion of still another removable spill and tamper-resistant top surface 600 for an interactive display. This Figure illustrates yet another approach for attaching a top layer 601 to a chassis top support (not shown) using a mounting frame 604 and a plurality of fasteners 610 (only one fastener shown). As depicted in FIG. 6, a diffuser sheet 622 is provided between top layer 601 and a support layer 612, which can optionally also be bonded to mounting frame 604. An additional transparent layer 614 is bonded to the lower surface of mounting frame 604 and traps support layer 612 in position. In one implementation, the support layer and the additional layer are optically transparent acrylic sheets, and the support layer is significantly thicker than top layer 601 in order to provide structural support to the top layer 601. Fasteners 610 are disposed in receptacles 606 formed in mounting frame 604 and extend through orifices 608 that penetrate the mounting frame and additional transparent layer 614.

Figure 7:
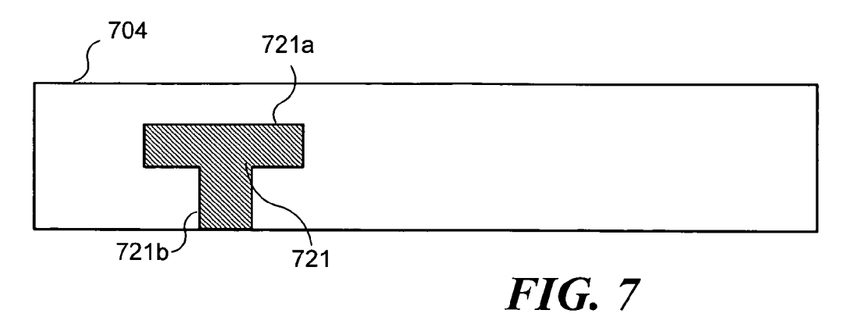
FIG. 7 is an inner side elevation view of a mounting rail having a fastener receptacle.
Figure 8:
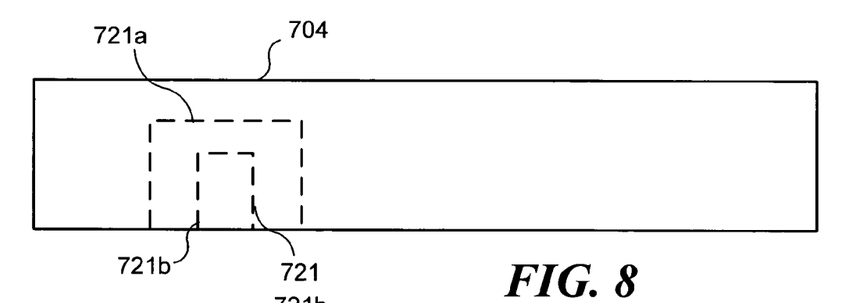
FIG. 8 is a top plan view of a mounting rail showing a fastener receptacle.
Figure 9:
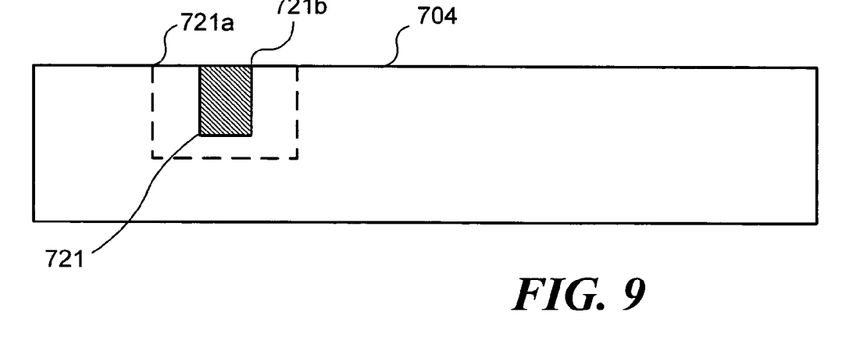
FIG. 9 is a bottom view of a mounting rail having a fastener receptacle.

FIG. 7 is a simplified inner side view of a portion of a mounting rail 704 having an open fastener receptacle 721. As illustrated in FIG. 7, fastener receptacle 721 includes a transverse slot 721a in which a vertical slot 721b is generally centered. It should be understood that FIG. 7 is not to scale and some features are exaggerated to highlight the physical configuration of the exemplary implementation. Transverse slot 721a of the fastener receptacle is sized and shaped for receiving a head or nut of a threaded fastener (not shown), while vertical slot 721b is sized for receiving the threaded shaft or shank of such a fastener. FIG. 8 is a top plan view of mounting rail 704, illustrating that the receptacle for a fastener can be embedded within the mounting rail in such a way that it is not be visible from a top view once mounting rail 704 is bonded to a lower surface of a top layer (not shown). FIG. 9 is a bottom view of mounting rail 704.

Figure 10:
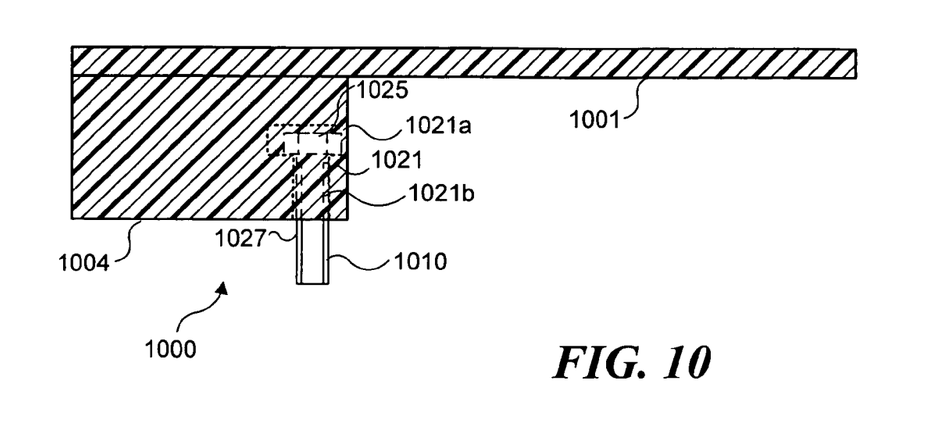
FIG. 10 is a cross-sectional end view of a mounting rail having a fastener receptacle.

FIG. 10 is a cross-sectional end view of an interactive display top 1000 comprising a mounting rail 1004 bonded to the underside of a top layer 1001. Mounting rail 1004 is shown as including a fastener receptacle 1021. As illustrated in FIG. 10 with hidden lines, the fastener receptacle includes a transverse slot 1021a for receiving a fastener head (or nut) 1025 and a vertical slot 1021b for receiving a threaded shaft or shank 1027 of a fastener 1010. As illustrated in FIG. 10, the fastener receptacle is open on an internal face of mounting rail 1004. This arrangement enables fastener 1010 to be removed after installation, thereby enabling interactive display top 1000 to be easily removed and replaced.

Exemplary Interactive Display

Figure 11:
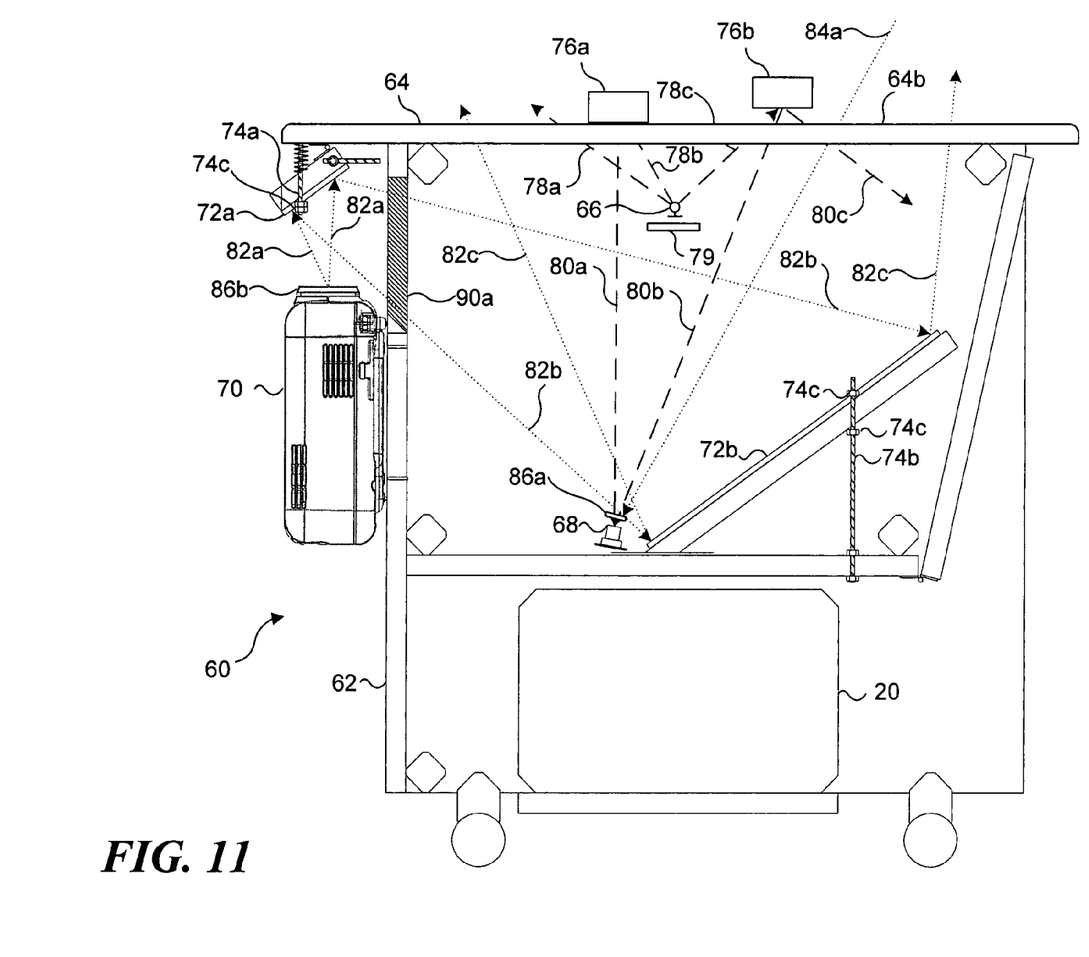
FIG. 11 is a schematic diagram of an exemplary interactive display table having an internal personal computer.

In FIG. 11, an exemplary interactive display table 60 is shown that includes a personal computer (PC) 20 within a frame 62 and which serves as both an optical input and video display device for the PC. In this cut-away Figure of the interactive display table 60, rays of light 82a-82c used for displaying text and graphic images are generally illustrated using dotted lines, while rays of infrared (IR) light used for sensing objects on or just above a display surface 64 of the interactive display table 60 are illustrated using dash lines. In this exemplary embodiment of the interactive display table, display surface 64 can be a tamper proof and liquid resistant display surface according to any of the implementations described with reference to FIGS. 1-10. The perimeter of the table surface around the actual display area in the center is useful for supporting a user's arms or other objects, including objects that may be used to interact with the graphic images or virtual environment being displayed on display surface 64.

IR light sources 66 preferably comprise a plurality of IR light emitting diodes (LEDs) and are mounted on the interior side of frame 62. The IR light that is produced by IR light sources 66 is directed upwardly toward the underside of display surface 64, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. As used herein and in the claims that follow in connection with objects positioned on or proximate to the interactive display surface, the term "adjacent to" is used with the intention that this term encompass both an object that is actually touching the interactive display surface as well as one that is just above the interactive display surface. Although only one IR source 66 is shown, it will be appreciated that a plurality of such IR sources may be mounted at spaced-apart locations around the interior sides of frame 62 to prove an even illumination of display surface 64. The IR light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64 include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of display surface 64, the amount of IR light that is reflected by the object increases to a maximum level that is achieved when the object is actually in contact with the display surface.

A digital video camera 68 is mounted to frame 62 below display surface 64 in a position appropriate to receive IR light that is reflected from any touch object or hover object disposed above display surface 64. The digital video camera 68 is equipped with an IR pass filter 86a that transmits only IR light and blocks ambient visible light traveling through display surface 64 along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64 and corresponds to an image of IR light reflected from objects on or above the display surface. It will be apparent that digital video camera 68 will also respond to any IR light included in the ambient light that passes through display surface 64 from above and into the interior of the interactive display including ambient IR light that also travels along the path indicated by dotted line 84a IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects such as hover object 76b that are closer to display surface 64 will reflect more IR light back to digital video camera 68 than objects of the same reflectivity that are farther away from the display surface. The digital video camera 68 senses the IR light reflected from "touch" and "hover" objects within its imaging field and produces a digital signal corresponding to images of the reflected IR light that is input to the PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention.

The interactive display table is operable to recognize an object and/or its position relative to the interactive display surface 64 by detecting its identifying characteristics using the IR light reflected from the object. The logical steps implemented to thus detect and identify an object and its orientation are explained in the commonly-assigned patent applications, including application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004.

Figure 12:
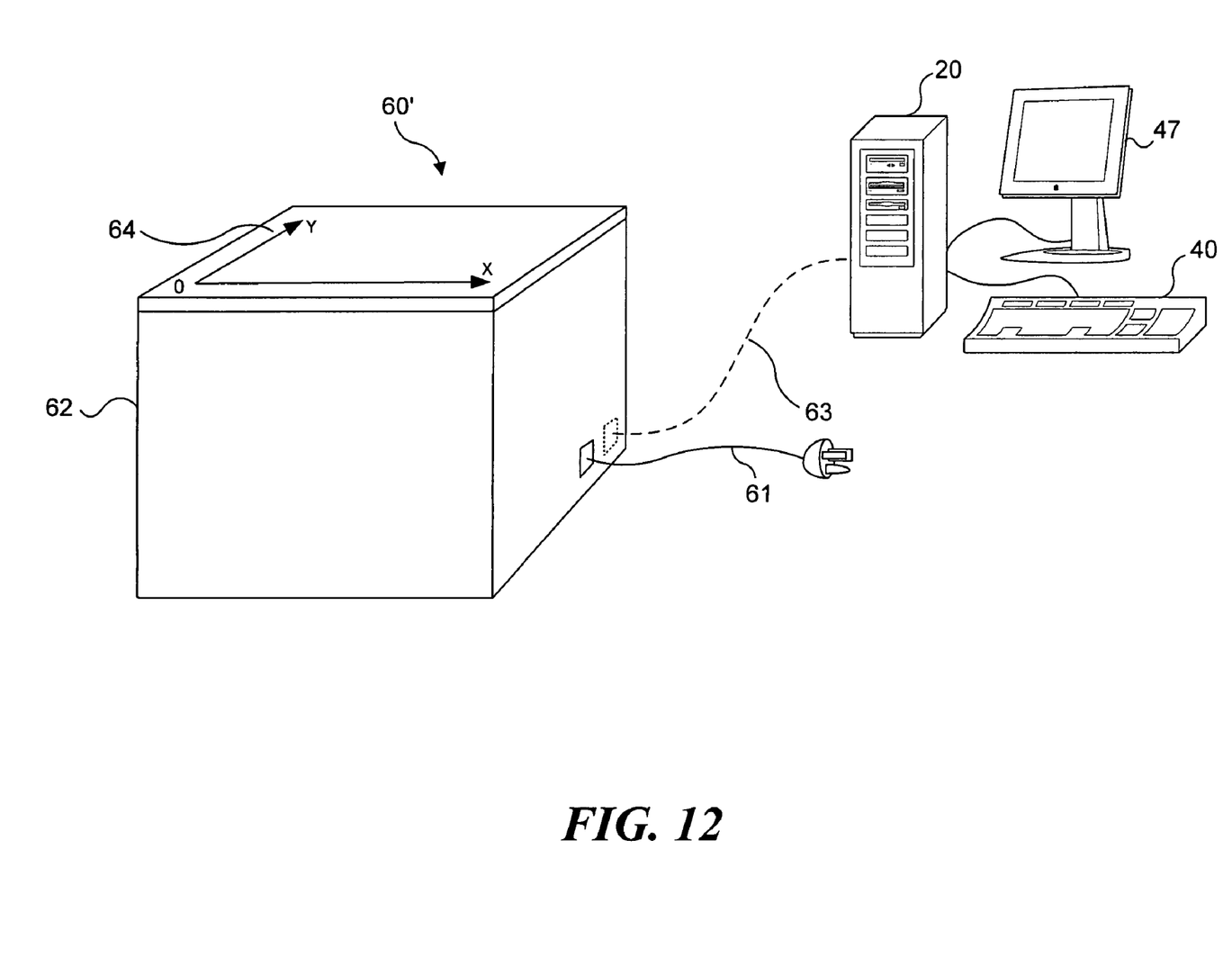
FIG. 12 is schematic diagram of another embodiment of an exemplary interactive display table coupled to an external personal computer.

PC 20 may be integral to interactive display table 60 as shown in FIG. 11, or alternatively, may instead be external to the interactive display table, as shown in the embodiment of FIG. 12. In FIG. 12, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this FIGURE, a set of orthogonal X and Y axes are associated with display surface 64, as well as an origin indicated by "0." While not discretely shown, it will be appreciated that a plurality of coordinate locations along each orthogonal axis can be employed to specify any location on display surface 64.

If an interactive display table 60' is connected to an external PC 20 (as in FIG. 12) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable an interaction between the graphic image or virtual environment visible on display surface 64 and identify objects that are resting atop the display surface, such as an object 76a, or are hovering just above it, such as an object 76b.

Again referring to FIG. 11, interactive display table 60 includes a video projector 70 that is used to display graphic images, a virtual environment, or text information on display surface 64. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on display surface 64 for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface. Clearly, the benefit of an easily replaceable vandal resistant and liquid spill resistant display surface as explained above apply regardless of the orientation of the interactive display.

It is also recognized that any of the implementations of a vandal and liquid resistant interactive display surface as discussed above may be useful in connection with interactive displays that do not include a projector for projecting images on the display surface, but instead use a different display technology, such a panel of liquid crystal display (LCD) elements, or other type of display technology. The interactive display surface may also use other techniques for sensing objects on or adjacent to the display surface other than the optical technique discussed above. Accordingly, it will be understood that the exemplary display surfaces described above in connection with FIGS. 1-10 are not limited to any specific type of display or sensing technology, but can be benefit almost any type of interactive display system.

Method of Attaching Display Top to Interactive Display Chassis

Another aspect of this technology is directed to an exemplary method for attaching a liquid and tamper resistant top to an interactive display chassis. A plastic mounting frame can be bonded to an undersurface of a plastic surface layer to provide a unified interactive display top that is readily removed and replaced, and which is liquid spill and vandal resistant. The plastic mounting frame can be bonded using a plastic welding adhesive such as Weld On 16™. Plastic welding solvents/adhesives and techniques are well known to those in the art, and therefore will not be discussed in further detail.

The mounting frame can be configured to be mounted to the interactive display chassis. In one implementation, fastener receptacles are provided on the plastic mounting frame, and corresponding mounting orifices for fasteners are provided on the interactive display chassis. The receptacles and orifices can be of any size and shape appropriate for receiving fasteners, such as nuts and bolts, screws, cam-locks, and other removable fastener types. As described below, the mounting orifices are configured for alignment with the receptacles on the plastic mounting frame. The interactive display top can thus be removably coupled to the interactive display chassis with the fasteners, so that the interactive display top can be easily removed and replaced, as necessary. In one implementation, an interactive display (e.g., as described above, for example, with reference to FIGS. 11 and 12) of a given dimension can be provided with a standardized fastener receptacle and orifice pattern, so that mass-produced interactive display tops having the standardized receptacle pattern can be interchanged on different interactive display chassis.

Another method implementation includes the additional step of providing the interactive display top with a support layer that is coupled to the chassis top. The support layer can be of any generally optically transparent material, such as plastic and the like, that can provide additional structural support to the display top when it is mounted on the display chassis. In one implementation the support layer is an acrylic plastic that is selected for optical transparency, and which is substantially thicker than a top layer of the display surface.

Yet another implementation includes the additional steps of forming a radius on at least a portion of an edge of the liquid and tamper resistant top layer, and then smooth polishing at least part of the edge of the interactive display top. The edge radius can have a radial dimension that provides a comfortable working surface for a user. Smooth polishing of the edge of display top renders the seam between the welded mounting frame and the surface layer nearly invisible to the naked eye, and provides a tamper-resistant display top.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A spill and vandal resistant top for an interactive display table, comprising:
   (a) an optically transparent top layer; and
   (b) a mounting frame, wherein:
      (i) the top layer comprises a shatter-resistant sheet having an upper surface, a lower surface, a top layer thickness, and a peripheral edge surface disposed between the upper surface and the lower surface, the upper surface of the top layer presenting a continuous gap-free and ridge-less surface that prevents a spilled liquid from entering the interactive display table and resists removal and damage by vandalism; and
      (ii) the mounting frame comprising a top surface and a peripheral edge surface that extends from the top surface, the top surface comprising a bonding surface that is bonded to the lower surface of the top layer such that the peripheral edge surface of the mounting frame is adjacent to the peripheral edge surface of the top layer, and a plurality of receptacles for fasteners that are configured to mount the mounting frame to a supporting chassis, the spill and vandal resistant top thus being removable and replaceable by releasing the fasteners, wherein the plurality of receptacles are concealed under the top layer when the top layer is bonded to the mounting frame and not concealed when the top layer is not bonded to the mounting frame;
   wherein the peripheral edge surfaces of the top layer and the mounting frame are polished to remove the seam between the top layer and mounting frame.

2. The spill and vandal resistant top of claim 1, wherein the top layer further comprises an optical diffuser.

3. The spill and vandal resistant top of claim 1, wherein the edge surface is polished to remove the seam between the top layer and mounting frame.

4. The spill and vandal resistant top of claim 1, wherein the mounting frame includes a plurality of orifices disposed along the inner frame edge surfaces, each of said plurality of orifices for receiving a fastener.

5. The spill and vandal resistant top of claim 1, wherein the mounting frame is affixed to the top layer using a plastic welding adhesive applied to the bonding surface of the mounting frame.

6. The spill and vandal resistant surface of claim 5, wherein the plastic welding adhesive is at least one of:
   (a) cyanoacrylate ester;
   (b) methyl ethyl ketone;
   (c) dichloromethane; and
   (d) acetone.

7. The spill and vandal resistant top of claim 1, further comprising a support layer having a smaller surface area than that of the top layer and wherein the support layer is disposed adjacent to the lower surface of the top layer.

8. The spill and vandal resistant top of claim 7, wherein the support layer comprises an acrylic sheet material selected for optical transparency.

9. The spill and vandal resistant top of claim 1, wherein the mounting frame comprises a plurality of sheets that are bonded together to form at least one continuous elongate mounting rail.

10. The spill and vandal resistant top of claim 9, wherein at least one of said plurality of sheets includes the receptacles for the fasteners.

11. The spill and vandal resistant top of claim 1, wherein the top layer is fabricated of an acrylic sheet material selected for durability and high optical contrast.

12. The spill and vandal resistant top of claim 1, wherein the mounting frame is fabricated from an acrylic material selected for structural strength.

13. The spill and vandal resistant top of claim 1, wherein a radius is formed between the edge of the top layer and the top surface of the top layer around the periphery of the top layer.

14. An interactive display table, comprising:
   (a) an interactive display chassis, the display chassis including a chassis top support;
   (b) a plurality of fasteners; and
   (c) a spill and vandal resistant top comprising:
      (i) an optically transparent top layer; and
      (ii) a mounting frame, wherein:
         (i) the top layer comprises a shatter-resistant sheet having an upper surface, a lower surface, a top layer thickness, and a peripheral edge surface disposed between the upper surface and the lower surface, the upper surface of the top layer presenting a continuous gap-free and ridge-less surface that prevents a spilled liquid from entering the interactive display table and resists removal and damage by vandalism; and
         (ii) the mounting frame comprising a top surface and a peripheral edge surface that extends from the top surface, the top surface comprising a bonding surface that is bonded to the lower surface of the top layer such that the peripheral edge surface of the mounting frame is adjacent to the peripheral edge surface of the top layer, and a plurality of receptacles for receiving the plurality of fasteners to mount the mounting frame to chassis top support, the spill and vandal resistant top thus being removable and replaceable by releasing the plurality of fasteners, wherein the plurality of receptacles are concealed under the top layer when the top layer is bonded to the mounting frame and not concealed when the top layer is not bonded to the mounting frame;
      wherein the peripheral edge surfaces of the top layer and the mounting frame are polished to remove the seam between the top layer and mounting frame.

15. The interactive display table of claim 14, wherein the plurality of fasteners includes at least one of:
   (a) a metal bolt;
   (b) a plastic bolt;
   (c) a metal nut;
   (d) a plastic nut;
   (e) a metal screw;
   (f) a metal cam lock; and
   (g) a plastic cam lock.

16. A method for removably attaching a liquid and tamper resistant top to an interactive display chassis of an interactive display table, comprising the steps of:
   (a) bonding a plastic mounting frame to an undersurface of a plastic surface layer to provide a unified interactive display top, the plastic mounting frame being bonded to the plastic surface layer such that the edge of the plastic mounting frame is adjacent to the edge of the plastic surface layer, wherein the mounting frame is configured to mount to the interactive display chassis, and wherein an upper surface of the plastic surface layer presents a continuous gap-free and ridge-less surface that prevents a spilled liquid from entering the interactive display table and resists removal and damage by vandalism;
   (b) providing a plurality of fastener receptacles on the plastic mounting frame, wherein the fastener receptacles are concealed under the plastic surface layer when the plastic surface layer is bonded to the plastic mounting frame and not concealed when the plastic surface layer is not bonded to the plastic mounting frame;
   (c) providing a plurality of mounting orifices on the interactive display chassis, the plurality of mounting orifices corresponding to and configured for alignment with the receptacles on the plastic mounting frame;
   (d) coupling the interactive display top to the interactive display chassis with removable fasteners, which substantially removably affix the interactive display top to the interactive display chassis; and
   (e) smooth polishing the edges of the plastic mounting frame and the plastic surface layer to remove the seam between the plastic mounting frame and the plastic surface layer.

17. The method of claim 16, further comprising the step of providing the interactive display top with a supporting layer that is coupled to the interactive display chassis.

18. The method of claim 16, and further comprising the steps of:
   (a) forming a radius on at least a portion of an edge of the liquid and tamper resistant top.

* * * * *

UNITED STATES PATENT AND TRADEMARK OFFICE
CERTIFICATE OF CORRECTION

| | |
|---|---|
| PATENT NO. | : 7,760,193 B2 |
| APPLICATION NO. | : 11/204676 |
| DATED | : July 20, 2010 |
| INVENTOR(S) | : Dawson Yee |

It is certified that error appears in the above-identified patent and that said Letters Patent is hereby corrected as shown below:

In column 10, line 7, in Claim 1, delete "gap- free" and insert -- gap-free --, therefor.

Signed and Sealed this

Fifteenth Day of February, 2011

David J. Kappos
*Director of the United States Patent and Trademark Office*